United States Patent [19]

Dickinson

[11] Patent Number: 5,706,517
[45] Date of Patent: Jan. 6, 1998

[54] METHOD AND APPARATUS FOR RETRIEVING DISTRIBUTED OBJECTS IN A NETWORKED SYSTEM

[75] Inventor: Robert David Dickinson, Hayward, Calif.

[73] Assignee: Object Technology Licensing Corp., Cupertino

[21] Appl. No.: 608,325

[22] Filed: Mar. 8, 1996

Related U.S. Application Data

[63] Continuation of Ser. No. 7,678, Jan. 22, 1993, abandoned.

[51] Int. Cl.$^6$ .................................................. G06F 3/14
[52] U.S. Cl. ......................................... 395/683; 395/333
[58] Field of Search ................................. 395/326, 327, 395/328, 329, 330, 331, 332, 333, 334, 335, 683, 701, 609, 610, 611

[56] References Cited

U.S. PATENT DOCUMENTS

| | | | |
|---|---|---|---|
| 3,658,427 | 4/1972 | DeCou | 356/156 |
| 3,881,605 | 5/1975 | Grossman | 214/1 CM |
| 4,082,188 | 4/1978 | Grimmell et al. | 209/73 |
| 4,622,633 | 11/1986 | Ceccon et al. | 395/700 |
| 4,635,208 | 1/1987 | Coleby et al. | 364/491 |
| 4,677,576 | 6/1987 | Berlin, Jr. et al. | 364/522 |
| 4,704,694 | 11/1987 | Czerniejewski | 364/513 |
| 4,742,356 | 5/1988 | Kuipers | 342/448 |
| 4,821,220 | 4/1989 | Duisberg | 364/578 |
| 4,885,717 | 12/1989 | Beck et al. | 364/900 |
| 4,891,630 | 1/1990 | Friedman et al. | 340/706 |
| 4,939,648 | 7/1990 | O'Neill et al. | 364/422 |
| 4,953,080 | 8/1990 | Dysart et al. | 364/200 |
| 5,025,395 | 6/1991 | Nose et al. | 395/154 |
| 5,041,992 | 8/1991 | Cunnigham et al. | 364/518 |
| 5,050,090 | 9/1991 | Golub et al. | 364/478 |
| 5,057,996 | 10/1991 | Cutler et al. | 395/650 |
| 5,060,276 | 10/1991 | Morris et al. | 382/8 |
| 5,075,848 | 12/1991 | Lai et al. | 395/425 |
| 5,093,914 | 3/1992 | Coplien et al. | 395/700 |
| 5,119,475 | 6/1992 | Smith et al. | 395/156 |
| 5,125,091 | 6/1992 | Staas, Jr. et al. | 395/650 |
| 5,129,083 | 7/1992 | Cutler et al. | 395/600 |
| 5,129,084 | 7/1992 | Kelly, Jr. et al. | 395/650 |
| 5,133,075 | 7/1992 | Risch | 395/800 |
| 5,136,705 | 8/1992 | Stubbs et al. | 395/575 |
| 5,136,712 | 8/1992 | Perazzoli, Jr. et al. | 395/700 |
| 5,151,987 | 9/1992 | Abraham et al. | 395/575 |

(List continued on next page.)

OTHER PUBLICATIONS

Leaflet on Panasonic's PV–S63 Video Camera published Mar. 1992.

Leaflet on Panasonic's PV–14 Video Camera published Mar. 1992.

Electronics and Communications in Japan, Part I–Communications, V.76(1), Jan. 1993, New York, US, pp. 11–23, S. Hattori et al. "A Multimedia Intelligent Message Communication System for Distributed Coordination Environments".

IBM Technical Disclosure Bulletin. V.35 (4B), Sep. 1992, New York US, pp. 291–293 "Calling Card Interface for Visual Telephony".

Patent Abstracts of Japan, V.16 (28) (P–1302), Jan. 23, 1992 & JP,A,03 240 163 (Hitachi) Oct. 25, 1991.

Hewlett Packard Journal, V.41 (5), Oct. 1990, Palo Alto, US, pp. 11–20, M. Thi Tran et al. "The HP IVI Object–Oriented Toolkit".

*Primary Examiner*—Thomas G. Black
*Assistant Examiner*—Ruay Lian Ho
*Attorney, Agent, or Firm*—Paul E. Kudirka

[57] ABSTRACT

A method and apparatus for representing the attributes of an object representing a person or entity in an object oriented operating system running on a computer. The information is presented in the form of a graphic depiction of a business card with information specific to a particular person, place or thing appearing on the business card. The information on the business card and the card itself can be used to invoke various actions. Further, any information on the card can be copied, pasted or otherwise manipulated by the system.

42 Claims, 12 Drawing Sheets

U.S. PATENT DOCUMENTS

| | | | |
|---|---|---|---|
| 5,168,441 | 12/1992 | Onarheim et al. | 364/146 |
| 5,177,685 | 1/1993 | Davis et al. | 364/443 |
| 5,181,162 | 1/1993 | Smith et al. | 364/419 |
| 5,187,790 | 2/1993 | East et al. | 395/725 |
| 5,297,283 | 3/1994 | Kelly, Jr. et al. | 395/650 |
| 5,315,703 | 5/1994 | Matheny et al. | 395/164 |

METHOD AND APPARATUS FOR RETRIEVING DISTRIBUTED OBJECTS IN A NETWORKED SYSTEM

CROSS-REFERENCE TO RELATED PATENT APPLICATION

This is a continuation of application Ser. No. 08/007,678 filed on Jan. 22, 1993, abandoned.

This patent application is related to the patent application entitled Object Oriented Framework System, by Debra L. Orton, David B. Goldsmith, Christopher P. Moeller, and Andrew G. Heninger, filed Dec. 23, 1992, and assigned to Taligent, the disclosure of which is hereby incorporated by reference.

FIELD OF THE INVENTION

This invention generally relates to the representation of a person or entity within an object oriented operating system, and more particularly, to the accessing of the represented person or entity through a selected communication path.

BACKGROUND OF THE INVENTION

Few individuals work upon a particular project in the absence of others. In contrast, a group of individuals typically work together upon a project. In particular, large work tasks are usually divided into smaller tasks which are, in turn, divided among a number of individuals. Hence, although work may be divided in many different ways, collaboration among individuals is ordinarily a necessity.

In order for diverse tasks to be accomplished, individuals must share information and ideas. Presently, personal computers are capable of providing document file sharing, print sharing, electronic mail and other methods of information sharing and communicating through local area networks.

Despite the advancements which have taken place in the area of local area networks, problems still exist. First, no universal naming service exists among networked computers. In other words, no common framework for names and representations of individuals exists within current networks to identify both network and non-network users. As a consequence, networks are filled with different locations for retrieving information concerning users. For instance, a set of applications, such as a directories or files, may be maintained to deal with a particular group of users for a particular application. However, no commonality exists among the set of files and directories for updating purposes. Therefor, a change in information will likely be reflected in some but not all applications since they are independent of each other. This processing increases the complexity of maintenance and leads to inconsistent usage of applications.

A second problem lies in the fact that applications only provide for network communications between network users. Individuals regularly interact, however, with many individuals who are outside the network. Thus, individuals who are not directly attainable by computer are not represented within computer applications. Moreover, network users which are represented within an application can only be communicated to through network channels.

Business cards are real-world objects which individuals typically can and do collect from others. Studies have shown that individuals retain approximately 150 business cards at any one time. Moreover, studies have demonstrated a desire among individuals to organize business cards in some manner.

Business cards typically indicate the various methods of communicating with the individual to whom the business card refers. Such communication methods ordinarily include telephone, computer network, electronic mail, facsimile, telecommunication business mailing address and home mailing address, among others. In contrast to business cards, however, current computer applications do not provide a user with an option of communication methods.

In sum, current computer applications fail to provide a user with a means by which individuals may communicate with others through different mediums. This is so whether or not the individuals sought to be communicated with are common network users. Furthermore, current computer applications fail to provide a common framework of information with respect to individuals. Thus, the prior art that the applicant is aware of provides a system that is overly restrictive and insufficiently accurate for performing typical communications.

SUMMARY OF THE INVENTION

The present invention overcomes the aforementioned deficiencies of the prior art by providing a system for communications with individuals through the formation and manipulation of diverse communication information.

The present invention provides an object oriented operating system for storing global communication information about persons or entities within a desktop environment. The information is stored with an object which is then made available for user interaction. Further, the present invention allows for direct manipulation of the objects so as to perform tasks such as addressing mail messages and establishing telephone connections. Moreover, the present invention provides for the formation of a set of business cards where each business card contains a method of communication. Formed business cards can be duplicated wherein the duplicated business card is synchronized and updated with original cards.

Such aforementioned attributes are contained within the present invention for integration within diverse network environments. The focus of the present invention thus provides an environment wherein diverse methods of communication are provided. Hence, such applications assist a user in making effective use of a workstation for communicating with others.

BRIEF DESCRIPTION OF THE DRAWINGS

The foregoing and other aspects and advantages of the present invention will be better understood from the following detailed description of the preferred embodiment of the invention with reference to the accompanying drawings, in which.

DETAILED DESCRIPTION OF THE PREFERRED EMBODIMENT OF THE INVENTION

COMPUTER SYSTEM

Figure 1:
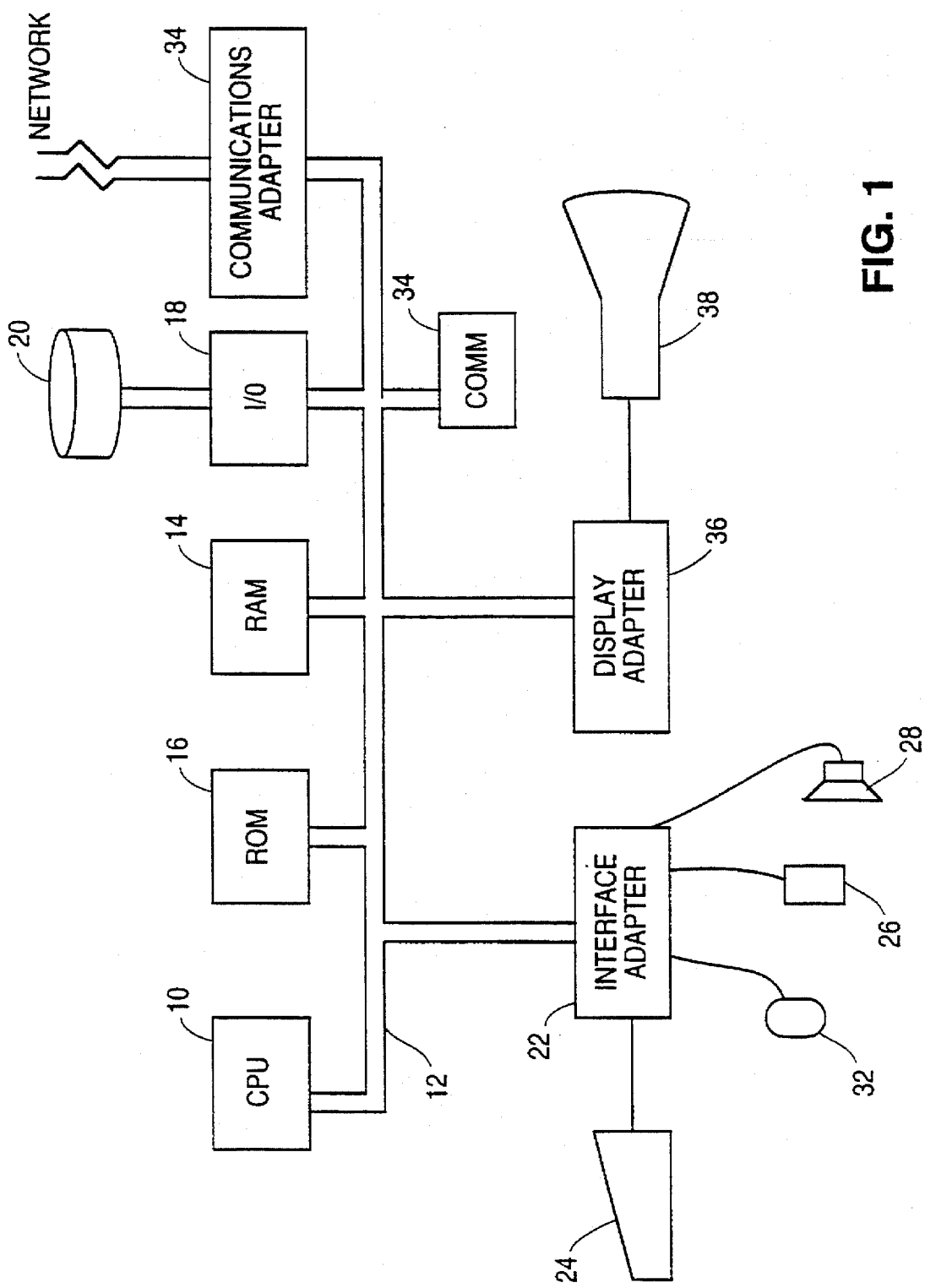
FIG. 1 is a block diagram of a computer system in accordance with the present invention.

A representative hardware environment is depicted in FIG. 1, which illustrates a suitable hardware configuration of a workstation 40 in accordance with the present invention. The workstation 40 has a central processing unit 10, such as a conventional microprocessor, and a number of other units interconnected via a system bus 12. The illustrated workstation 40 shown in FIG. 1 includes a Random Access Memory 14 (RAM), a Read Only Memory 16 (ROM), an I/O adapter 18 for connecting peripheral devices such as disk units to the bus 12, a user interface adapter 22 for connecting a keyboard 24, a mouse 26, a speaker 28, a microphone 32, and/or other user interface devices such as a touch screen device (not shown) to the bus 12. The workstation 40 may also have a communications adapter 34 for connecting the workstation 40 to a data processing network 30 and a display adapted 36 for connecting the bus 12 to a display device 38.

COMPOSITION OF BUSINESS CARDS

A business card is a document which contains a set of information pertaining to various environments. A business card may contain a great variety of information relating to an individual. The following information is illustrative of the type of information that can be contained within a business card: name; job title; division, department, and group identification; manager name; employee identification number; work telephone numbers; home phone number (voice and data); home facsimile number; business address; home address; workstation server name; workstation zone; workstation drop box volume name; preferred printer; secondarily preferred printers; protocol addresses such as TCP/IP, AppleTalk, OSI, and XNS; mail addresses such as Internet address, X.400 address, AppleLink™ address, QuickMail address, BITNET and UUCP; editable notes that the holder of the business card has regarding the person represented by the business card; and, a unchangeable comment or note written by the person represented by the business card.

Selected information is displayed when a business card is initially opened. A business card within its initial state is a composition of text, graphics and icons which represent information relating to the business card owner. Other information may be displayed through progressive disclosure mechanisms. The two progressive disclosure mechanisms are (i) a set of tabs, and (ii) a list view.

Figure 2:
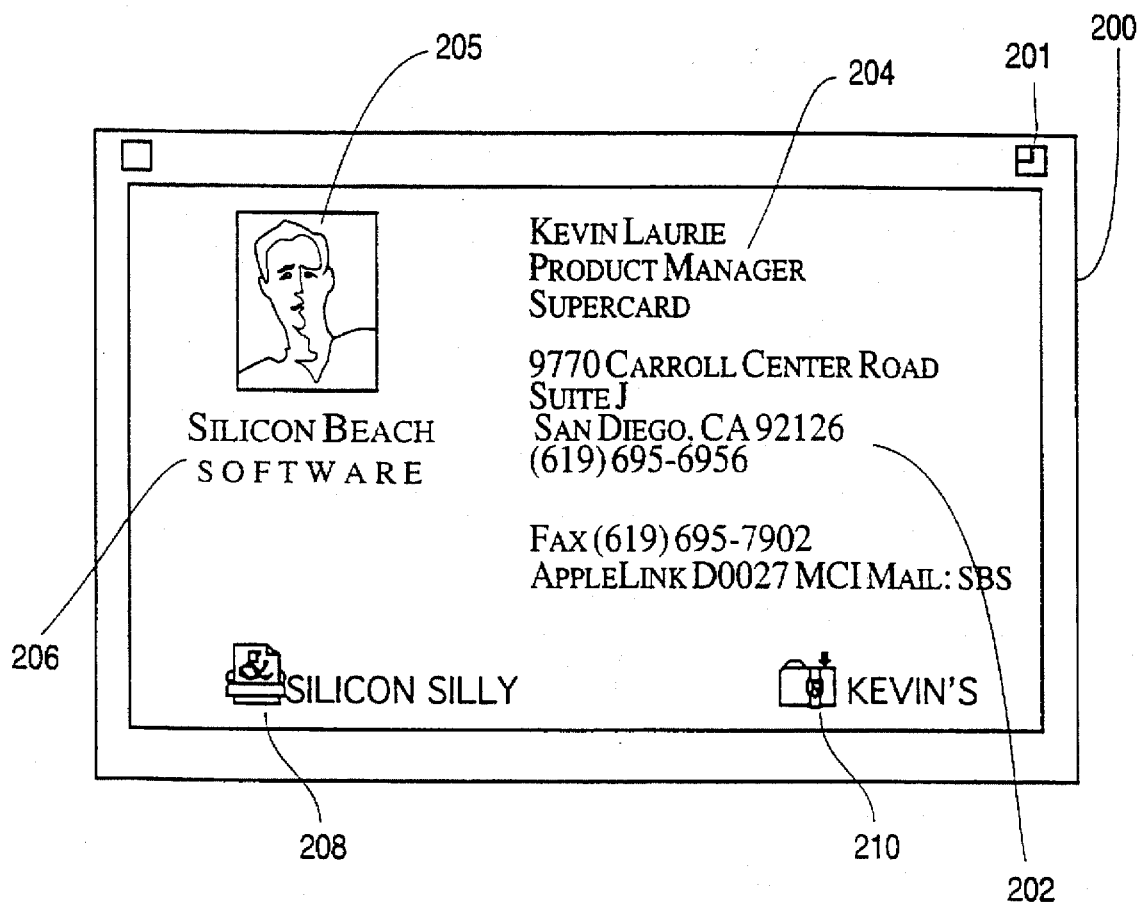
FIG. 2 illustrates a business card in its initial open state in accordance with the present invention.

Referring to FIG. 2, a business card in its initial open state is illustrated. The initial open state 202 of business card 200 comprises text 204, graphics 206 and icons 208 and 210. Text 204 indicates: the owner of the business card ("Kevin Larue"); the position of the business card owner ("Product Manager"—"Super Card"); the address of the business card owner ("9770 Carrol Center Road"—"Suite J" "San Diego, Calif. 92126"); the telephone number of the business card owner ("(619) 695-6956"); the facsimile number of the business card owner ("(619) 695-7902"); and various electronic communication data ("Applelink D0027 MCI Mail: SBS"). Graphic 206 indicates the name of the entity within which the business card owner is associated ""Silicon Beach Software"). Icons 208 and 210 provide further information about the business card owner upon being engaged by double-clicking of a mouse.

The specific layout and items that are presented are formatted according to user requirements under user control. Items are selected from the primary view to prepare a progressive disclosure view. This flexibility provides control for progressive display of a window according to a user's requirement. A user can selectively display the primary view or the progressive view using the control at 201.

Figure 3:
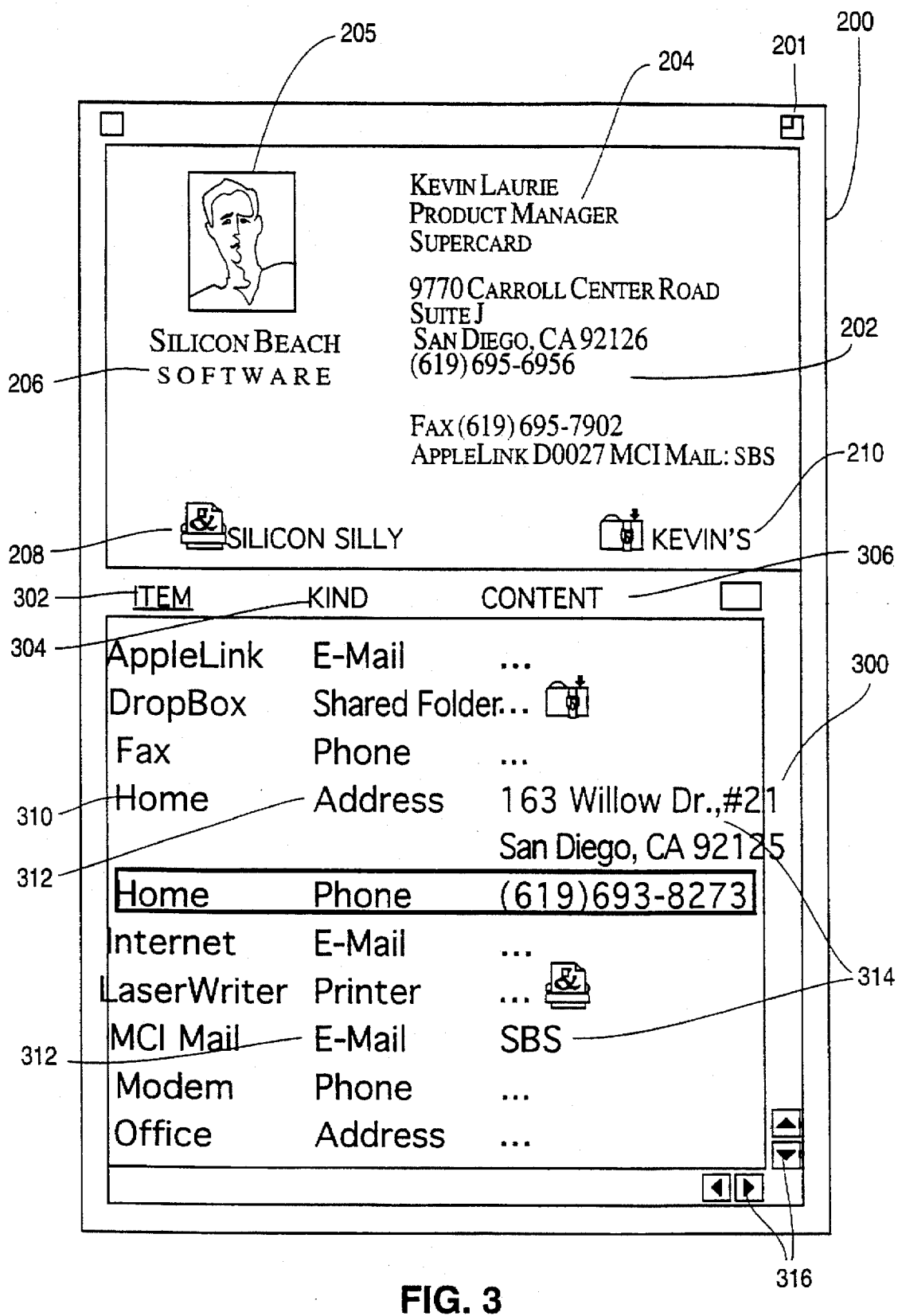
FIG. 3 illustrates a list view of a business card in accordance with the present invention.

Referring to FIG. 3, a list view of a business card is illustrated. List view 300 of business card 200 is appended to the bottom of initial open state 202 when selected through engagement of icon 210. List view 300 contains item column 302, kind column 304 and content column 306. Each item 310 is thus described by its method of communication content as referred to with reference numerals 312 and 314, respectively. The list view 300 may be scrolled in any direction by scrolling arrow set 316. Display column headings 302 are extensible and dynamic sorting is available using any of the columns as sort fields.

Referring to FIGS. 4 through 7 a set of tabs for business card 200 is illustrated. A tab is appended to the bottom of initial open state 202 when selected through the engagement of icon 210.

Figure 4:
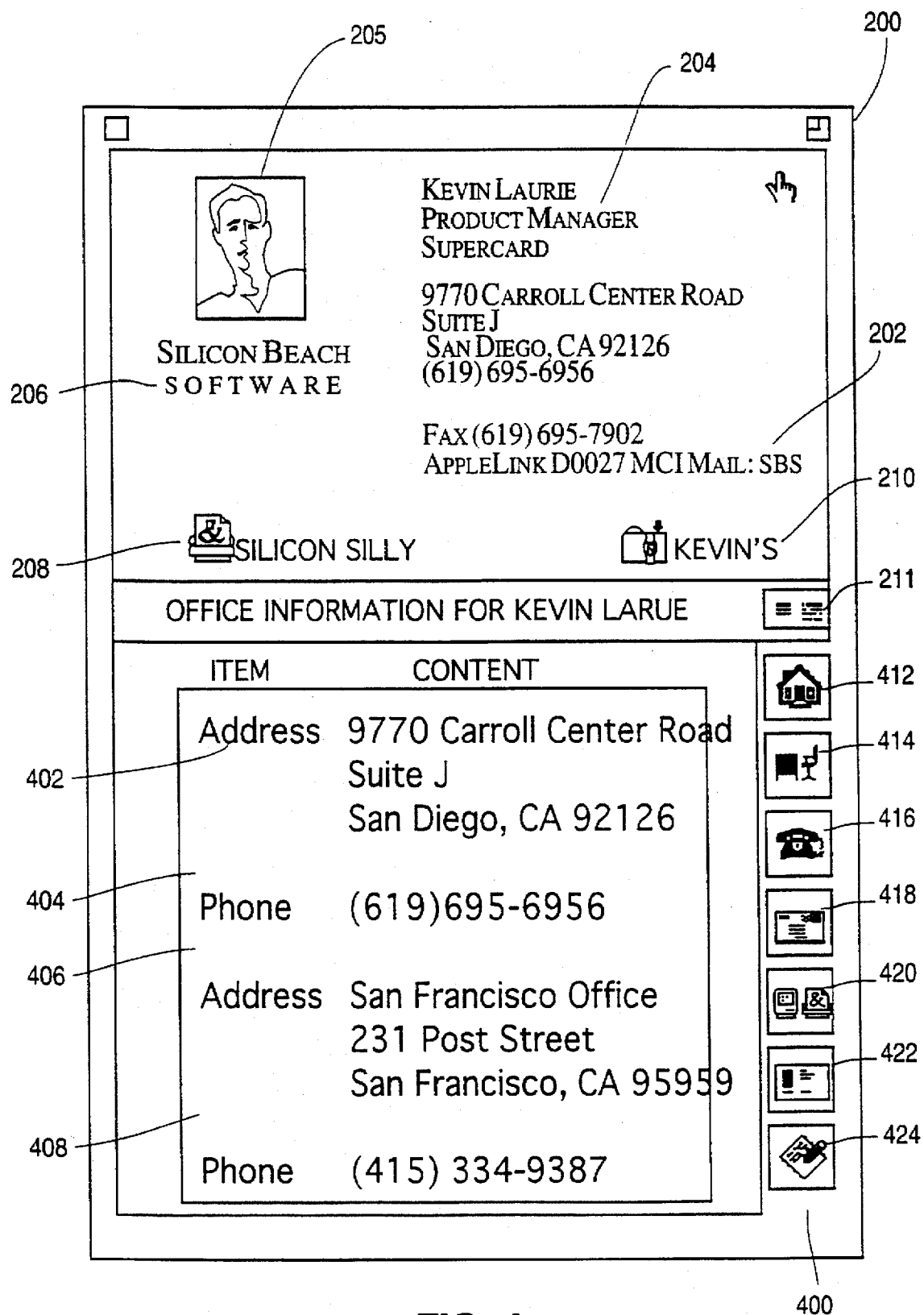
FIG. 4 illustrates a tabbed view of a business card with an office tab selected in accordance with the present invention.

Referring to FIG. 4, an office tab of business card 200 is illustrated. Office tab 400 displays information concerning the place of business of the business card owner as indicated by title 410. Accordingly, addresses 402 and 406 and business telephone numbers 404 and 408 are displayed. Office tab 400 also displays icons 412, 414, 416, 418, 420, 422 and 424 which represent residence information, mailing address information, telephone information, electronic mail information, printer information, contacts, and various notations, respectively. Selection of any such icon by clicking with a mouse results in the display of a tab corresponding to the selected icon. A switch 211 is available to toggle between a list and a tabbed view of information in a business card.

Figure 5:
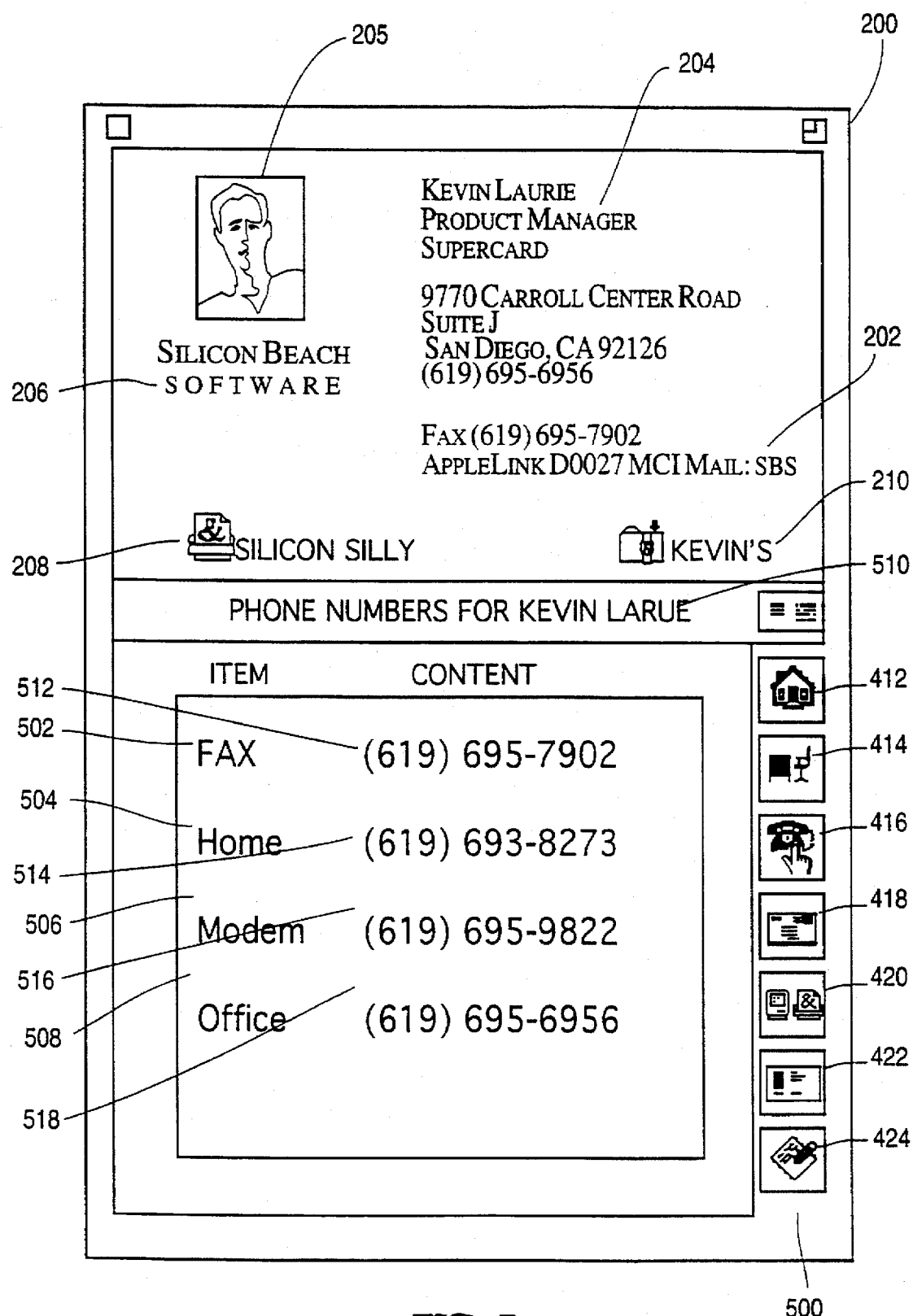
FIG. 5 illustrates a tabbed view of a business card with a telephone tab selected in accordance with the present invention.

Referring to FIG. 5, a telephone tab of business card 200 is illustrated. Selection of icon 416 displays phone tab 500. Phone tab 500 contains information concerning the various telephone numbers of the business card owner as indicated by title 510. Such information comprises items 502, 504, 506 and 508 which denote facsimile, home, modem and office telephone numbers, respectively. The telephone numbers of items 502, 504, 506 and 508 are referred to with reference numerals 512, 514, 516 and 518, respectively.

Figure 6:
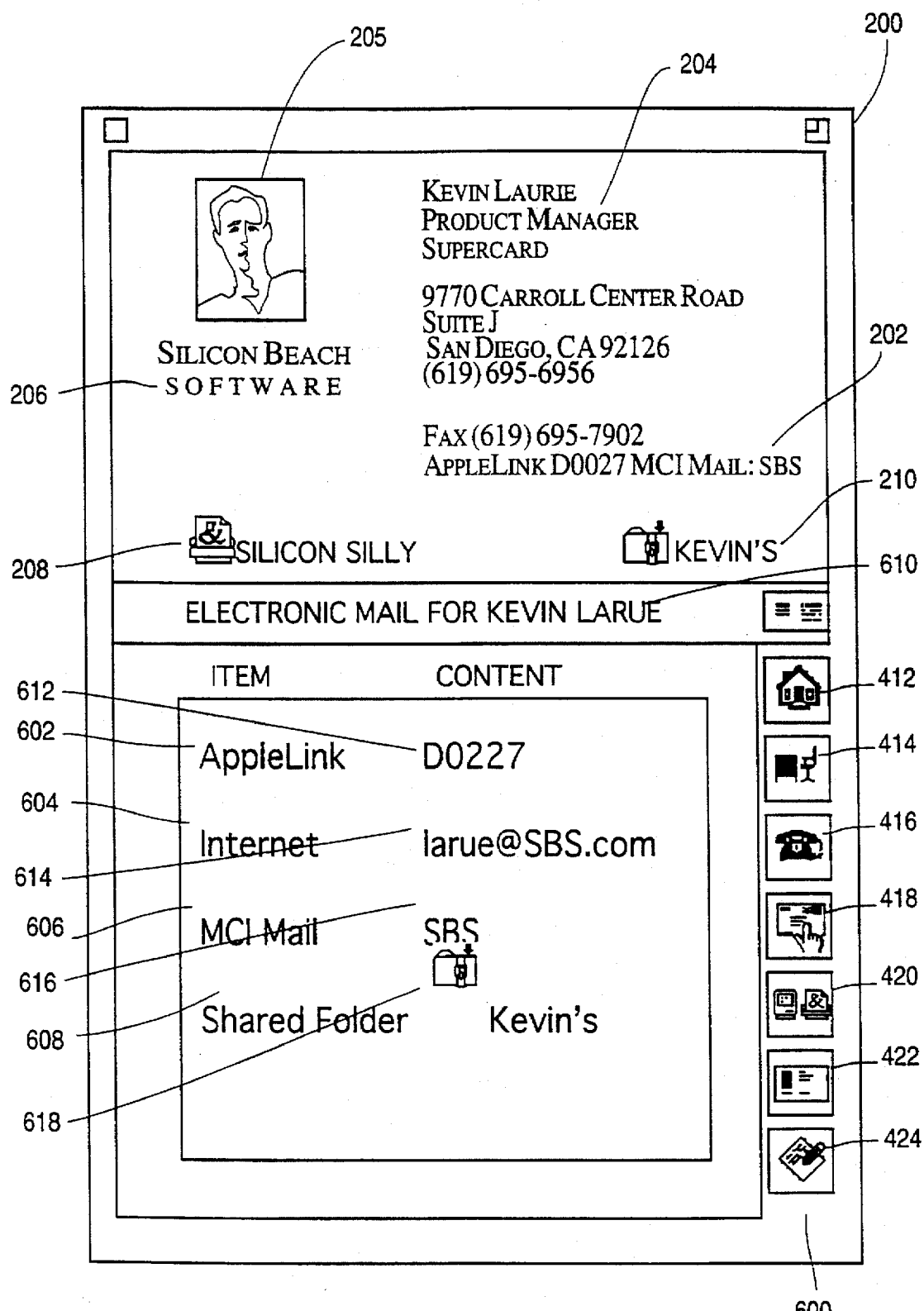
FIG. 6 illustrates an electronic mail tab of a business card in accordance with the present invention.

Referring to FIG. 6, an electronic mail tab of business card 200 is illustrated. Selection of icon 418 displays electronic mail 600. Electronic mail 600 contains information concerning the various telephone numbers of the business card owner as indicated by title 610. Such information comprises items 602, 604, 606 and 608 which denote AppleLink, Internet, MCI Mail, and Shared Folder methods of electronic mail, respectively. The address listings of items 602, 604, 606 and 608 are referred to with reference numerals 612, 614, 616 and 618, respectively. It should be noted that address listing 618 of item 608 is also shown as icon 210. This follows since item 608 represents a shared folder containing multiple electronic mail recipients.

Figure 7:
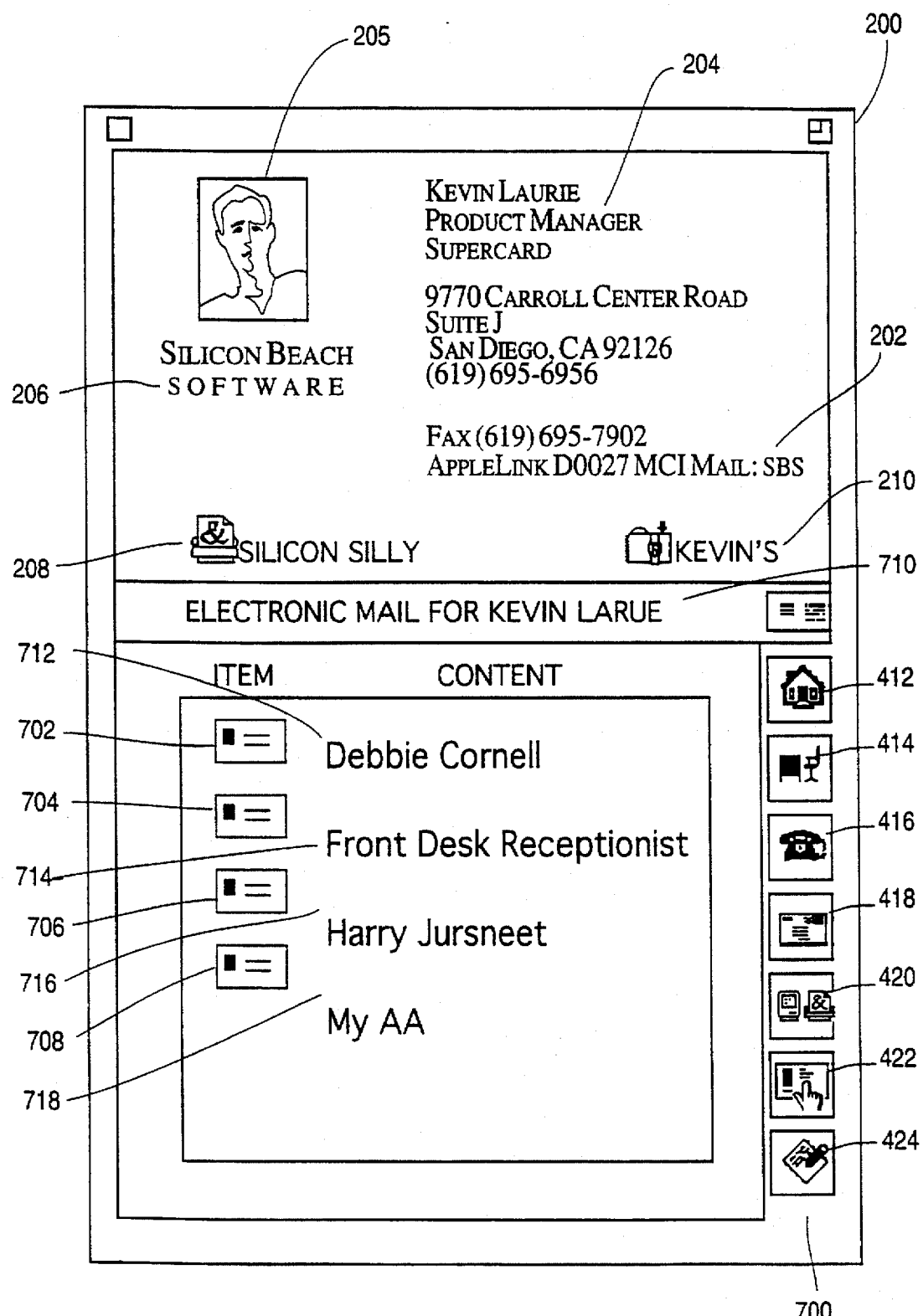
FIG. 7 illustrates a contacts tab of a business card in accordance with the present invention.

Referring to FIG. 7, a contacts tab of business card 200 is illustrated. Selection of icon 422 displays contacts tab 700. Contacts tab 700 contains information concerning the various contacts of the business card owner as indicated by title 710. Such information comprises items 702,704,706 and 708. Items 702, 704, 706 and 708 denote the names of four contacts whose names are referred to with reference numerals 712, 714, 716 and 718, respectively.

Business cards can be either published or personal. Published business cards are those business cards which are deposited in a central store or are otherwise globally available. Published business cards are also responsive to browsing applications through predetermined protocols. In contrast, personal business cards are not known to the rest of the network. They are only contained within the local workstation. Personal business cards are created when particular information is of a private nature or because the information is not relevant to others upon the network. For example, friends or contacts of a network user, that are attainable by telephone or are not on the network, would be contained within a personal business card.

A network user, to whom a business card refers, chooses the pieces of information from the person object that should be inserted within a business card. Similarly, information concerning a non-network user is judiciously selected for insertion within a business card. Some information may be personal and the user would not want it to be distributed such as a home telephone number. For instance, the individual may want the capability to create a business card containing such information, as well as other less public information, for distribution among friends or trusted colleagues. However, the individual may also want to be able to have a business card without such information to distribute to others.

In addition to the distinction between published and personal business cards, business cards are organized in terms of the information contained therein. In particular, a business card can store information regarding: (i) individual persons; (ii) groups of persons, which in turn refer to business cards of individual persons; and (iii) personas which do not represent an actual person, but a role. For example, a business card relating to a persona could refer to a research librarian. Such a business card comprises one or more contacts which contain further information for how to contact the persona, and there can even be a dynamic selection of one such contact at communication time.

BUSINESS CARD INFORMATION STORAGE AND RETRIEVAL

Business cards are constructed to provide network and non-network communications. In particular, the present invention provides address information for establishing network connections. This might include simple protocol addresses such as a TCP/IP numeric address or a sophisticated stack definition. Non-network communications, such as phone dialing, are also supported by the present invention. Further, business cards store information that concern various types of connections. Such information includes different protocol families, electronic mail addresses, and phone and facsimile information. Moreover, business cards contain information to support multiple protocol address types such as BabelFish stack definitions which include AppleTalk and TCP/IP.

A person object is an object which contains global communication information concerning a particular individual. A person object is typically located on the workstation utilized by the network user to which the person object refers. A business card object which refers to a particular user may be retained when the such user relocates to a different workstation so as to maintain a consistent environment. The person object is not considered, however, to be a source of public information. This is in contrast to published business cards which are sources of public information.

The person object is used as a repository of a large set of environment information for a user. Such environment includes workspace configuration information and user-specific preferences. Business cards, however, are considered to be a subset of the information contained within a person object. Accordingly, each business card contains information which pertains to methods of communication. Being just a document representation, it is possible and often useful to have multiple business cards for an individual represented by a given person object.

Ordinarily, an original business card is created from the information within the person object. Less frequently, an original business card is created in the absence of a person object. Regardless of the manner of creation, an original business card is also referred to as a master business card. The person described by a given master business card is referred to as the master business card owner.

Once formed, a master business card may be copied to form a number of duplicated or replicated business cards. The information within both duplicated and replicated business cards corresponds to that information within the master business card. Replicated business cards are, however, be adapted to the subjective tastes of the user who copied the master business card. In contrast, duplicated business cards are unchanged copies of master business cards.

A publishing host is the workstation where a master business card was created. The publishing host is also the likely the place where the corresponding person object resides since the information contained within the master business cards typically derives from a person object. Individual workstations will thus typically have a mixture of master business cards and replicated business cards. Workstations that have a duplicated or replicated master business card are referred to as recipient card-holders and replicated hosts, respectively.

Defining a mixing class, such as MHasProperties, provides for an efficient means to integrate common functionality among person objects, name service objects, and business card objects. In the absence of a mixing class, different storage models would be necessary for each backing object.

Figure 8:
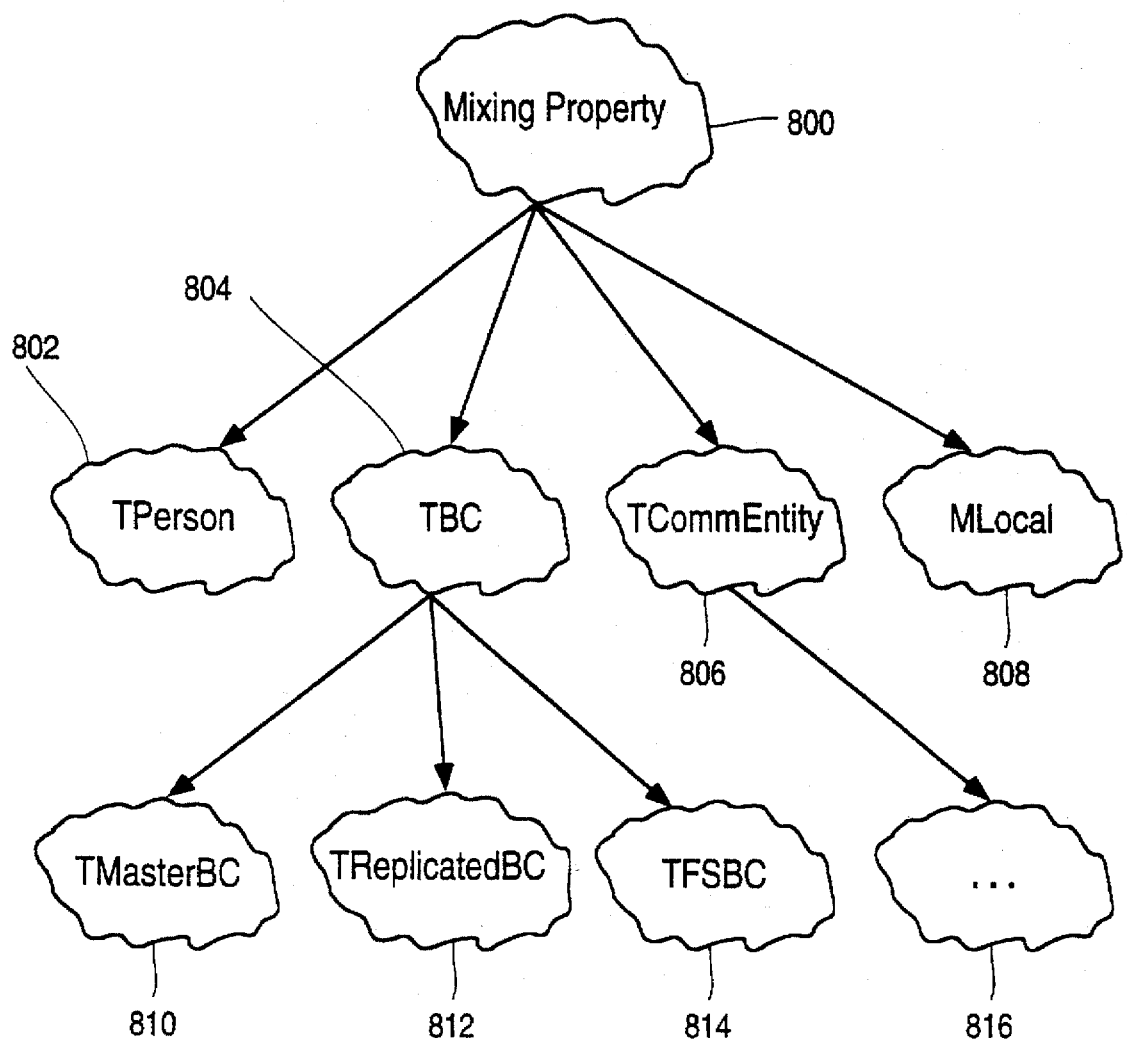
FIG. 8 illustrates an inheritance hierarchy for the mixing properties of the present invention.

Referring to FIG. 8, an inheritance hierarchy for the mixing properties of the present invention is illustrated. Mixing property 800 has four classes. Namely, the four classes are Person, TBC, TCommEntity, and MLocal which are referred to by reference numerals 802, 804, 806 and 808, respectively. Class TPerson 802 refers to the class of existing person objects. Class TBC 804 defines the abstract interface of business cards. Class TCommEntity 806 defines the network name service that contains a set of directories of resource names and addresses. Class MLocal 808 defines the business card data found within a particular workstation.

Classes TBC 804 and TCommEntity 806 are further decomposed into sub-classes. Class TBC 804 is further decomposed into classes TMaster BC, TReplicated BC and TFSBC which are referred to with reference numerals 810, 812 and 814, respectively. Class TCommEntity 806 is also further decomposed into the distinct directories which possess resource names and addresses. This is indicated by class 816.

Figure 9:
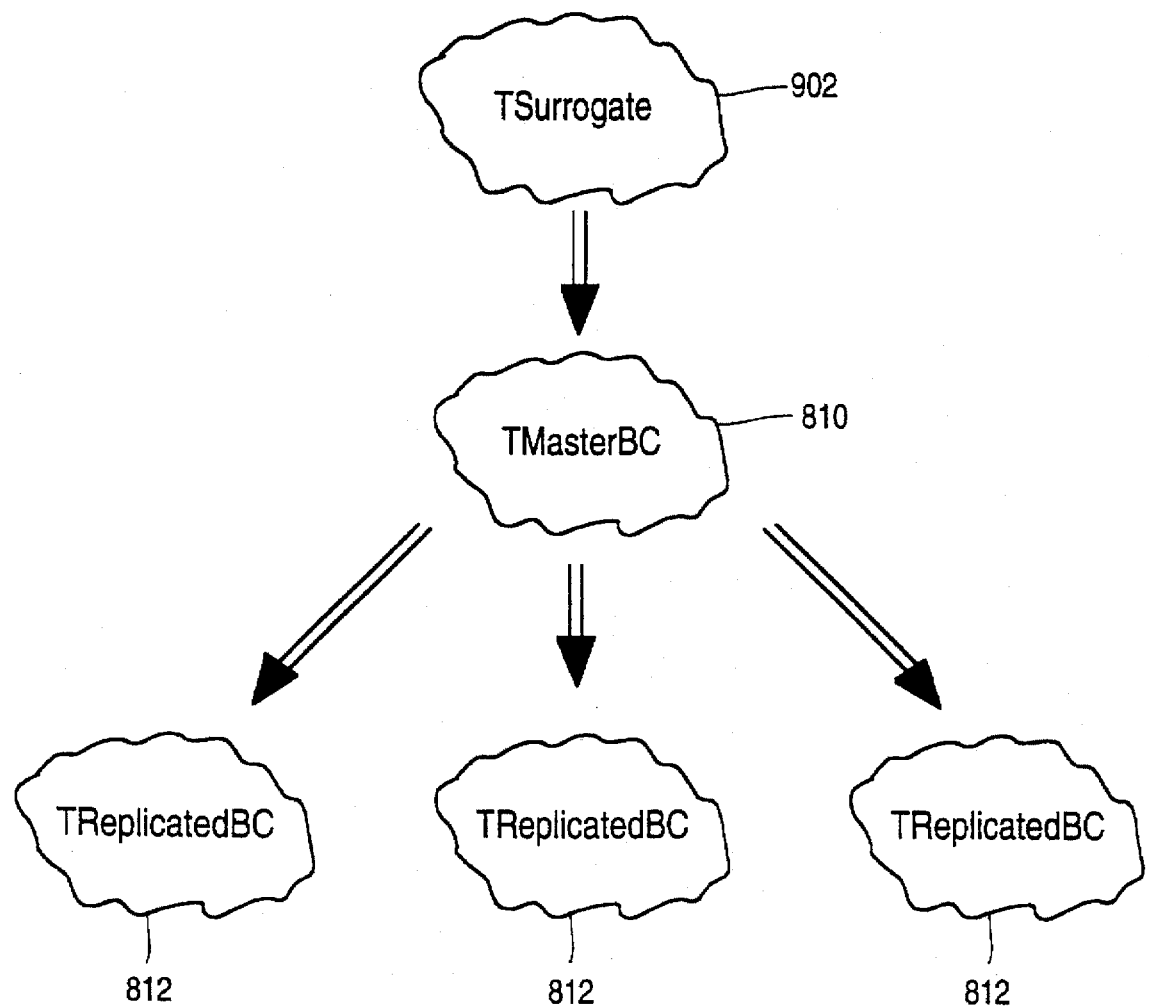
FIG. 9 illustrates a data flow diagram for the business card information in accordance with the present invention.

Referring to FIG. 9, a data flow diagram for the business card information is illustrated. Information is initially contained within class TSurrogate 902 which derives its information from class TPerson 804. Class TSurrogate 902 directly passes all information to class TMaster BC 810. In turn, class TMaster BC 810 passes the data obtained from class TSurrogate 902 to the class of replicated business cards as denoted by class TReplicated BC 812.

Figure 10:
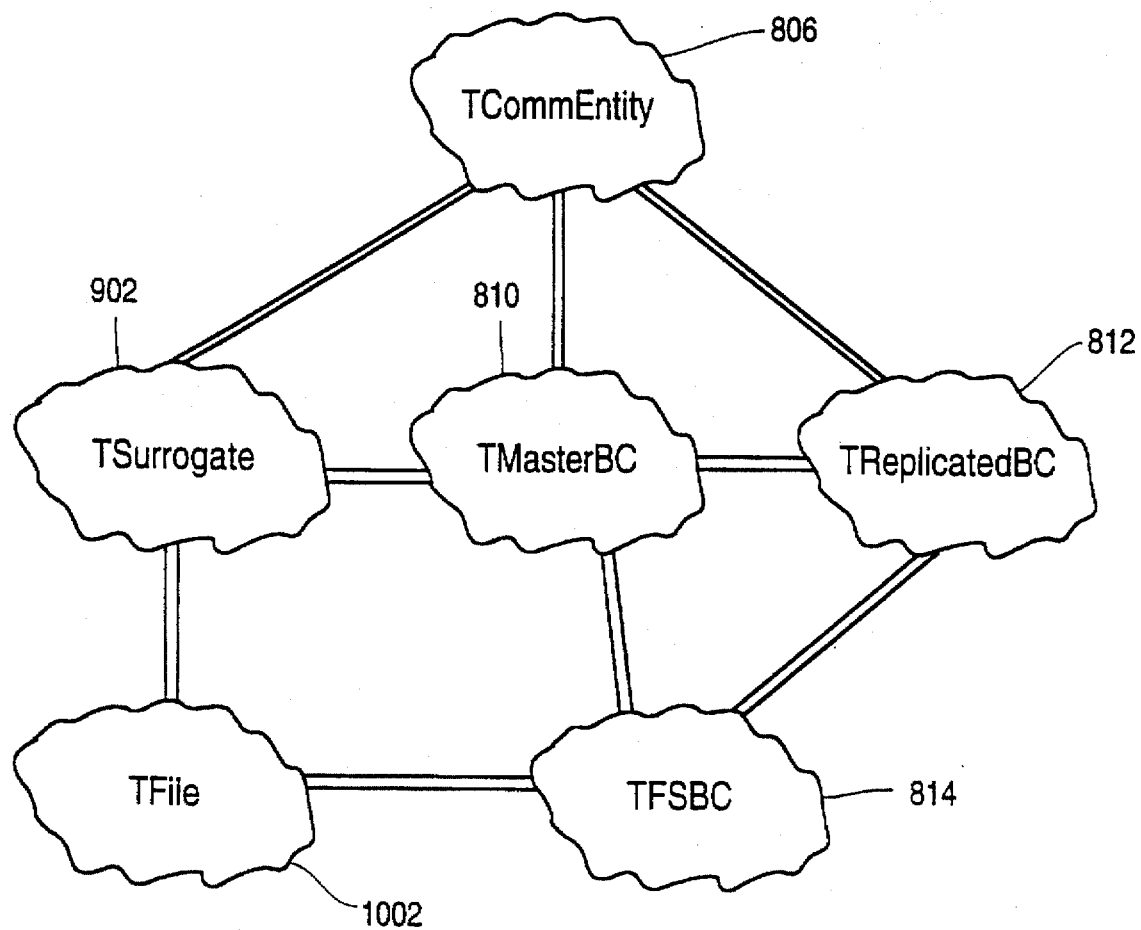
FIG. 10 illustrates the using relationships between the classes and subclasses of mixing properties in accordance with the present invention.

Referring to FIG. 10, the using relationships between the classes and subclasses of mixing properties 800 is illustrated. Communication information is initially stored within TFile 1002 which has a using relationship with TSurrogate 902 and TFSBC 814. TMasterBC 810 utilizes TSurrogate 902 to receive information stored within person objects which are connection related to TPerson 802. Since a business card is typically a subset of public information contained within a person object, changes within a person should be reflected the master business card. Hence, the using relationship between TMasterBC 810 and TSurrogate 902. TMasterBC 810 employs TCommEntity 806 for publication of its information within the network name space. Published information can then be copied from TMasterBC 810 or from TCommEntity 806 into TReplicatedBC 812. When either a master or copied business card reside on a disk, TFSBC 814 can also be employed within a using relationship.

Many attributes are stored card. As such, as card. As such, a business card can be considered to have a number of different backing objects. Each backing object holds a definitive value for some attribute of the business card. In general, business cards are views of person objects. This relationship means that information stored within the person object is also contained in the business card. Accordingly, the person object is considered the definitive source. Other business cards are created solely from name service entities. In such instances, the name service object is deemed the backing object. Replicated business cards have master business cards as their primary backing object. The three aforementioned primary backing objects (person objects, master business card objects and name service entities), thus share a common interface for property support.

Figure 11:
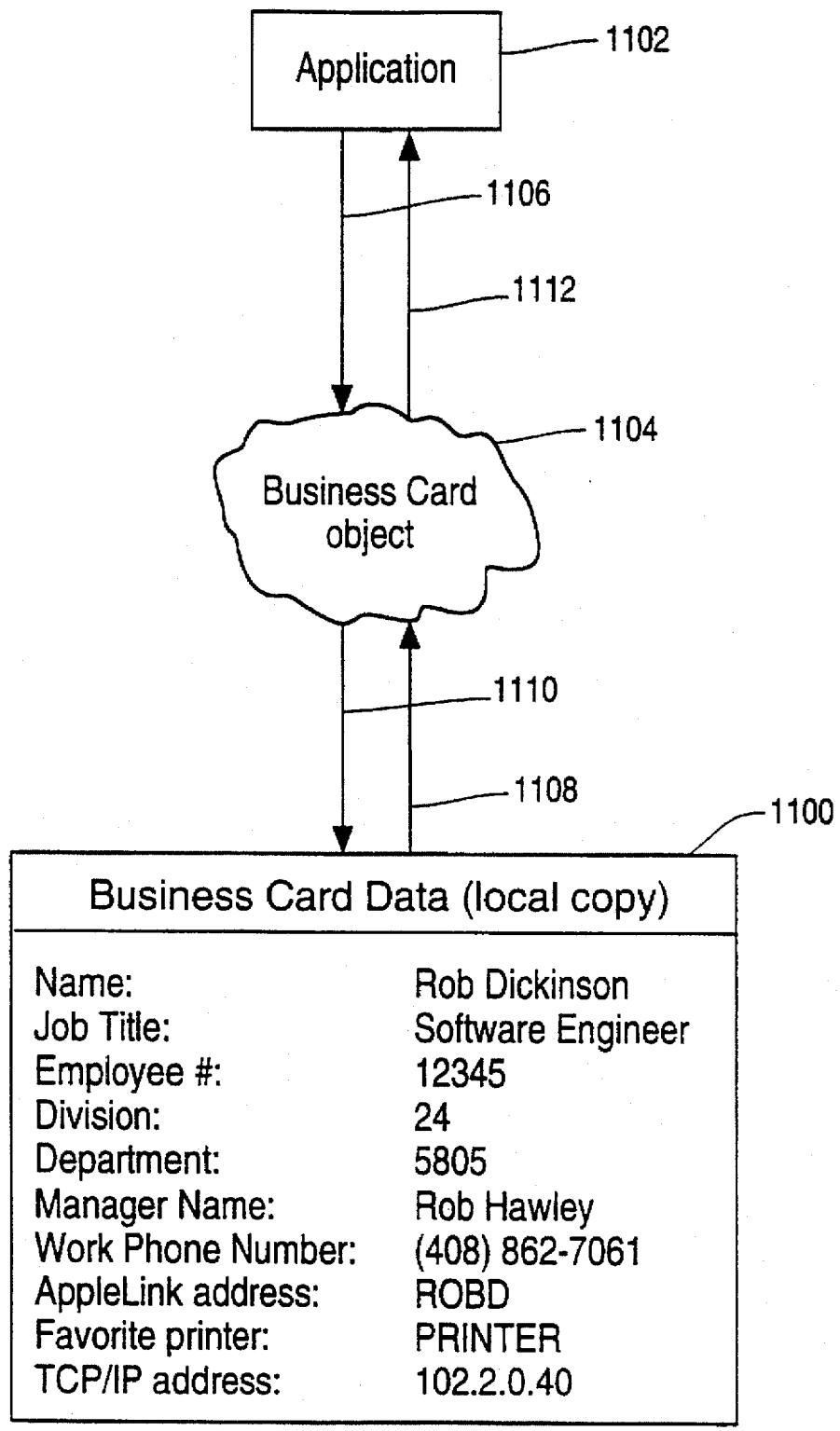
FIG. 11 illustrates the method of retrieving business card information when the information selected for retrieval exists upon the workstation where retrieval is sought in accordance with the present invention.

Referring to FIG. 11, the method of retrieving business card information when the information selected for retrieval exists upon the workstation where retrieval is sought. When an application seeks to retrieve a business card, as referred to with reference numeral 1102, corresponding business card object 1104 is initially solicited. In turn, business card object 1104 allocates data corresponding to the selected business card object within the local workstation 1100 as indicated by directional arrow 1108. Local workstation 1100 possesses all data contained with a given business card as illustrated within block 1112. The corresponding data is then retrieved from local workstation 1100 and transferred to business card object 1104. Thereafter, the corresponding data is further transferred to application 1102 which originally solicted such information.

Sufficient information is stored within name services to allow for browsing of business card objects and the making of network connections with the objects described by the business cards. Such design permits complete business cards to be instantiated from name service entities through the utilization of the publishing host. Also, partial business cards can be created from name service entities. Partial business cards can be employed in transactions without being fully instantiated. Only the necessary information will be obtained from the publishing host.

Figure 12:
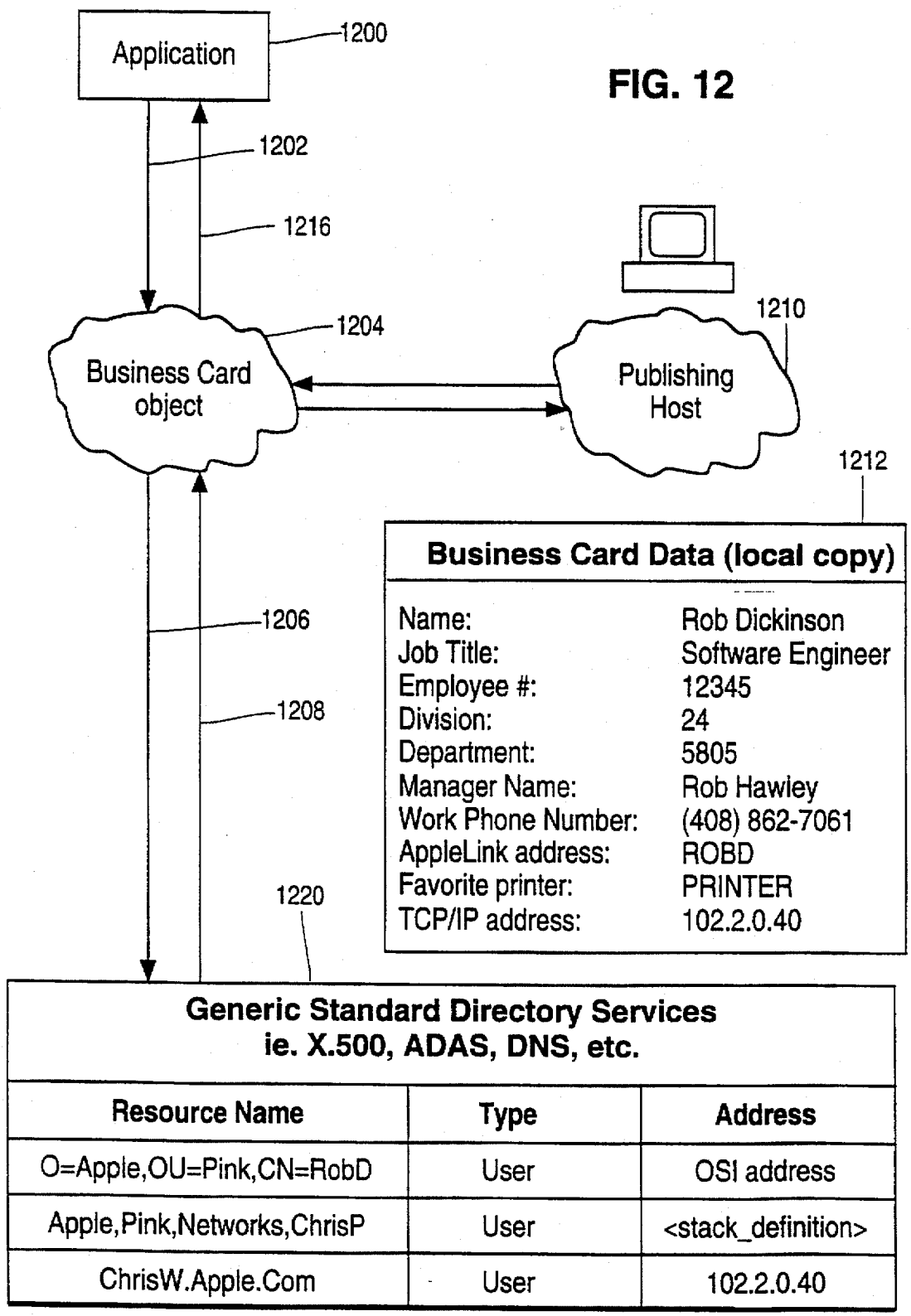
FIG. 12 illustrates the method of retrieving business card information when the information selected for retrieval does not exist upon the workstation where the retrieval is sought in accordance with the present invention.

Referring to FIG. 12, the method of retrieving business card information when the information selected for retrieval does not exist upon the workstation where the retrieval is sought. As indicated by directional arrow 1202, application 1200 initially selects business card object 1204. Business card object 1204 then allocates the address corresponding to business card object 1204 within the network name services data base 1220. Thereafter, the network name services data base 1220 transfers such allocated address back to business card object 1204. The allocation and transfer of a corresponding address are indicated by directional arrows 1206 and 1208, respectively. Business card object 1204 then allocates the data corresponding to the selected business card object within publishing host 1210. This is accomplished through the utilization of the retrieved address. Publishing host 1210 possesses all data relevant to a given business card object as illustrated within block 1212. The corresponding data is then transferred from publishing host 1210 to business card object 1204 and then further transferred to application 1200. Such transfers are indicated by directional arrows 1214 and 1216, respectively.

This design provides many advantages. First, simpler modification of business card information is permitted while browsing functionality is accomplished without excessive broadcast behavior. Second, access failures are avoided since the information is highly distributed. Thus, if the name service is inaccessible, business cards still contain adequate information for non-network connections. Third, by partitioning the information between the directories and publishing hosts, sufficient information for a default connection is created within the workstation of an individual. Hence, network updates are considerably decreased since the information necessary for a default connection is minimal and changes infrequently.

The aforementioned design calls for the publishing host of a master business card to provide information to holders of partial name service based replicas or local replicas. For instance, a particular user might observe a business card within a network name service browser and copy it within the desktop of the particular user. The name service network only holds partial information, however, and a full business card must be created to store on that users machine. A fully instantiated business card is created by contacting the publishing host and obtaining all other information. The publishing host has a business card service running which answers such queries. It is capable of both returning the entire set of attributes or individual attributes for a given business card which it possesses. Name service entities will sufficient information to contact the business card service for a user which can, in turn, provide the remaining information.

The present invention allows for complete functionality within different network environments. Although some incompatible workstations will not be able to take full advantage of business card functionality, such workstations can act as targets of operations from compatible workstations. That is, a user operating upon a first network can retain a business card, having information on mail addresses, for a user who operates upon a second network. Although the second network is incompatible with the first, the retained business card may be utilized within a mail application just as one would for a user of the second network.

User applications of business cards are made simplistic. Naive users can create, modify, update, delete, and copy business cards, as well as utilize business cards within a collaboration. Knowledge of the replicated nature of a business card is hidden from a naive user. Further, knowledge of the distributed nature of a business card is also hidden from a naive user.

Business cards maintain limited utility when under fault conditions such as when the name service(s) supporting business cards is unavailable. Even if the name service supporting business cards is unavailable, replicated business cards can be used as normal. Thus, the when a network is inaccessible business cards are still viewable for manual usage, and connection mechanisms other than through the network are still operable such as the telephone connections and facsimile services.

It is desirable for individuals to keep track of documents received from a certain person or for which a certain person is a contact. Users may also want to be able to stamp a document with a users business card or person icon.

MAINTENANCE OF REPLICATED BUSINESS CARDS

A set of mechanisms are employed for maintaining replicated versions of business card objects. Such mechanisms complement each other so as to provide a comprehensive feature set. Each mechanism within the set is not deemed to be exclusive of another, although expediency of implementation might require only a partial subset. The set of mechanisms is as follows: (i) manual user initiated updating, (ii) fault-based synchronization; and, (iii) periodic background synchronization.

The first mechanism, manual user initiated updating, is utilized when a user has modified a business card and seeks to reset the values of certain attributes back to the original state. In such a instance, a set of attributes can be selected and thereafter synchronized with those of the master business card.

The second mechanism, fault-based synchronization, is utilized when an attempt is made to use a business card, that is determined to contain inaccurate information, for a connection. In such an instance, an attempt is undertaken to update the business card with the most recent information from the master publishing host. This allows the replications to be updated when needed and has the additional advantage of consuming network bandwidth for synchronization with respect to only those replications actually employed.

The third mechanism, periodic background synchronization, is a process which periodically synchronizes replicated business cards with their masters. This occurs infrequently and does not consume large amounts of system resources or network bandwidth. The model for how this takes place can be characterized as pull-model synchronization.

Pull-model synchronization denotes a process which withdraws data from a master host. A procedure of withdrawing information from the master host is preferable to other procedures for the following reasons. First, pull-based replication allows for flexibility in determining the degree of staleness acceptable for the data. Second, push-model replications are ill-suited for application within the present invention. Push-model replications propagate updated information by requiring either broadcasted updates, knowledge of a set of replica hosts, or random host contact with the update propagated by an epidemic algorithm. However, the methods of copying business cards prohibits any design which requires knowledge of the replicated hosts. Moreover, epidemic algorithms proffer a number of assumptions concerning the data which are not valid in the present invention.

The design of the present invention does not provide for simultaneous synchronization of all replicated business cards on a workstation. Rather, only one or a few of the local replicated business cards are simultaneously synchronized when the workstation where they reside is largely idle. Therefore, individual business cards are synchronized on the same order or less. When a workstation has more than one replicated business card with the same publishing host, all such replicated business cards are synchronized simultaneously. This allows the replicated business cards to share a common connection and therefore eliminate additional operations. Also, updates to master data are likely to be infrequent and thus the majority of effort is in determining what is up to date and what is not. In this case, the synchronization process consumes the most time in establishing connections, and thus pooling such queries together is deemed highly beneficial.

Although epidemic algorithms are not employed within a synchronization mechanism for business cards, some aspects of the algorithms can be used to optimize synchronization performance as well as minimize load. First, whenever a workstation contacts another workstation to perform periodic synchronization of a replicated business card, a list of replicated business cards possessed by a workstation and their respective versions are passed to the master publishing host.

If the master publishing host has replicas which are more recent than those within the workstation, those replicas will be updated with the information in the publishing host replicas. In addition, the publishing host could update its replicas with the more recent versions within a workstation. Hence, a general synchronization between the two workstations is undertaken which results in the upkeep of current information.

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. An apparatus for use in a networked computer system having a first user at a local terminal with personal information pertaining to the first user stored therein, a second user at a remote terminal and a network directory server, the apparatus making available to the second user part of the information stored in the local terminal, the apparatus comprising:

(a) business card class information in the local terminal and the remote terminal including information defining a data structure and program code defining logic for storing references to user information in the data structure, logic for copying user information from another business card object into the data structure;

(b) means responsive to a request from the first user for instantiating a master business card object from the business card class information in the local terminal;

(c) means controlled by the first user for executing the storing logic for storing references to a first part of the information stored in the local terminal in the data structure of the master business card object;

(d) means controlled by the first user for storing a second part of the information stored in the local terminal and a reference to the master business card object in the network directory server;

(e) means responsive to a request from the second user for instantiating a replicated business card object from the business card class information in the remote terminal; and (f) means controlled by the second user for executing the copying logic in the replicated business card object to access the network directory server and copy the second information part stored in the network directory server into the data structure of the replicated business card object.

2. The apparatus as recited in claim 1 wherein the network directory server comprises means responsive to an access by the replicated business card object for using the reference to the master business card object to copy contents of the master business card object data structure into the data structure of the replicated business card.

3. The apparatus as recited in claim 1 wherein the first information part stored in the local terminal is stored in a person object that contains information about the first user and the means for instantiating the master business card object receives a reference to the person object.

4. The apparatus as recited in claim 3 wherein the first information part stored in the local terminal includes preferences and configurations associated with the first user.

5. The apparatus as recited in claim 1 wherein the network directory server includes means for publishing information identifying master business card objects which have been instantiated in the networked computer system.

6. The apparatus as recited in claim 1 wherein the replicated business card object instantiating means includes means for instantiating a plurality of replicated business card objects.

7. The apparatus as recited in claim 1 wherein the data structure in the master business card object includes means for storing references to additional master business card objects.

8. The apparatus of claim 1 further including means responsive to a request from a third user for instantiating a second replicated business card object from the business card class information in the local terminal and means controlled by the third user for executing the copying logic in the second replicated business card object to copy the first information part stored in the local terminal into the data structure of the second replicated business card object.

9. The apparatus of claim 1 wherein the network directory server includes name service entity objects, and wherein the second information part is stored in one of the name service entity objects.

10. The apparatus of claim 1 including display means for graphically depicting categories of information and wherein the means for executing the storing logic in the master business card object causes the storing logic to store a graphic image in the master business card data structure for display on the display means.

11. The apparatus of claim 10 including a pointing device for identifying the graphic image displayed on the display means, a selecting device for selecting an identified graphic image and means responsive to a selection of the graphic image and to movement of the pointing device for dragging the graphic image from a first location on the display means and dropping it at another location on the display means to invoke an action.

12. The apparatus of claim 10 including a pointing device for identifying the graphic image displayed on the display means, a selecting device for selecting an identified graphic image and means responsive to a selection of the graphic image and to movement of the pointing device for dragging a copy of the graphic image from a first area on the display means to another area on the display means.

13. The apparatus of claim 10 wherein information stored in the data structure of the master business card is associated with a plurality of graphic icons displayed on the display means and wherein the apparatus includes a pointing device for identifying one of the plurality of graphic icons, a selecting device for selecting an identified graphic image and means responsive to a selection of an identified graphic icon and to movement of the pointing device for dragging the selected graphic icon to another graphic image representing another object and transferring information associated with the selected graphic icon to the another object to invoke an operation.

14. The apparatus of claim 10 wherein information stored in the data structure of the master business card is associated with a plurality of graphic icons displayed on the display means and wherein the apparatus includes a pointing device for identifying one of the plurality of graphic icons, a selecting device for selecting an identified graphic image and means responsive to a selection of an identified graphic icon and to movement of the pointing device for dragging the selected graphic icon to another area on the display means.

15. The apparatus as recited in claim 1 wherein the replicated business card object includes means for obtaining update information from the master business card object in response to a user request to obtain the update information.

16. The apparatus as recited in claim 1 wherein the replicated business card object includes means for obtaining update information from the master business card object in response to an error which occurs during use of the information stored in the replicated business card object.

17. The apparatus as recited in claim 1 wherein the replicated business card object includes means for periodically obtaining update information from the master business card object.

18. The apparatus as recited in claim 1 wherein the means for instantiating a replicated business card object instantiates a plurality of replicated business card objects and wherein each of the replicated business card objects includes means for obtaining update information from the master business card object in response to a user request.

19. The apparatus as recited in claim 18 wherein each of the replicated business card objects includes means for obtaining update information from the master business card object in response to an error which occurs during use of the information stored in the each replicated business card object.

20. The apparatus as recited in claim 18 wherein each of the replicated business card objects includes means for periodically obtaining update information from the master business card object.

21. A method for use in a networked computer system having a first user at a local terminal with personal information pertaining to the first user stored therein, as second user at a remote terminal and a network directory server, the method making available to the second user part of the information stored in the local terminal, the method comprising the steps of:

(a) storing business card class information in the local terminal and the remote terminal, the business card class information including information defining a data structure and program code defining logic for storing references to user information in the data structure, logic for copying user information from another business card object into the data structure;

(b) instantiating a master business card object from the business card class information in the local terminal in response to a request from the first user;

(c) executing the storing logic for storing references to a first part of the information stored in the local terminal in the data structure of the master business card object;

(d) storing a second part of the information stored in the local terminal and a reference to the master business card object in the network directory server;

(e) instantiating a replicated business card object from class information in the remote terminal in response to a request from the second user for; and (f) executing the copying logic in the replicated business card object to access the network directory server and copy the second information part stored in the network directory server into the data structure of the replicated business card object.

22. The method as recited in claim 21 including the step of:

(g) using the reference to the master business card object to copy contents of the master business card object data structure into the data structure of the replicated business card.

23. The method as recited in claim 21 wherein the first information part stored in the local terminal is stored in a person object that contains information about the first user and step (c) comprises the step of:

(c1) executing the storing logic for storing a reference to the person object.

24. The method as recited in claim 23 wherein step (c) comprises the step of:

(c2) executing the storing logic for storing preferences and configurations associated with the first user.

25. The method as recited in claim 24 including the step of:

(h) publishing information identifying master business card objects which have been instantiated in the networked computer system.

26. The method as recited in claim 21 wherein step (e) comprises the step of:

(e1) instantiating a plurality of replicated business card objects.

27. The method as recited in claim 21 wherein the data structure in the master business card object includes means for storing references to additional master business card objects and step (c) comprises the step of:

(c3) storing references to additional master business card objects in the data structure of the master business card object.

28. The method of claim 21 further including the steps of:

(i) instantiating a second replicated business card object from the business card class information in the local terminal in response to a request from a third user; and (j) executing the copying logic in the second replicated business card object to copy the first information part stored in the local terminal into the data structure of the second replicated business card object.

29. The method of claim 21 wherein the network directory server includes name service entity objects, and wherein the method further includes the step of:

(k) storing the second information part in one of the name service entity objects.

30. The method of claim 21 wherein the computer system includes display means for graphically depicting categories of information and wherein step (c) comprises the step of:

(c4) storing a graphic image in the master business card data structure for display on the display means.

31. The method of claim 30 wherein the computer system includes a pointing device for identifying the graphic image displayed on the display means, a selecting device for selecting an identified graphic image and wherein the method comprises the steps of:

(l) dragging the graphic image from a first location on the display means in response to a selection of the graphic image and to movement of the pointing device and dropping it at another location on the display means to invoke an action.

32. The method of claim 30 wherein the computer system includes a pointing device for identifying the graphic image displayed on the display means, a selecting device for selecting an identified graphic image and wherein the method comprises the step of:

(m) dragging a copy of the graphic image from a first area on the display means to another area on the display means in response to a selection of the graphic image and to movement of the pointing device.

33. The method of claim 30 wherein information stored in the data structure of the master business card is associated with a plurality of graphic icons displayed on the display means and wherein the computer system includes a pointing device for identifying one of the plurality of graphic icons and a selecting device for selecting an identified graphic image and wherein the method comprises the step of:

(n) dragging the selected graphic icon to another graphic image representing another object and transferring information associated with the selected graphic icon to the another object to invoke an operation in response to a selection of an identified graphic icon and to movement of the pointing device.

34. The method of claim 30 wherein information stored in the data structure of the master business card is associated with a plurality of graphic icons displayed on the display means and wherein the apparatus includes a pointing device for identifying one of the plurality of graphic icons, a selecting device for selecting an identified graphic image and wherein the method comprises the step of:

(o) dragging the selected graphic icon to another area on the display means in response to a selection of an identified graphic icon and to movement of the pointing device.

35. The method as recited in claim 21, further including the step of obtaining update information for the replicated business card object from the master business card object in response to a user request to obtain the update information.

36. The method as recited in claim 21 further including the step of obtaining update information for the replicated business card object from the master business card object in response to an error which occurs during use of the information stored in the replicated business card object.

37. The method as recited in claim 21 further including the step of periodically obtaining update information for the replicated business card object from the master business card object.

38. The method as recited in claim 21 wherein step (e) comprises the steps of:

(e2) instantiating a plurality of replicated business card objects; and (e3) obtaining update information for each of the plurality of replicated business cards from the master business card object in response to a user request.

39. The method as recited in claim 38 wherein step (e2) comprises the step of obtaining update information for each of the replicated business card objects from the master business card object in response to an error which occurs during use of the information stored in the each replicated business card object.

40. The method as recited in claim 38 wherein step (e2) comprises the step of periodically obtaining update information for each of the replicated business card objects from the master business card object.

41. Object-oriented apparatus for storing and managing a collection of related data associated with a user having a name, the apparatus being for use in a computer system having a local workstation with a local storage and a remote workstation with a remote storage, the local and remote workstations being connected by a computer network with a name service directory, the database system comprising:

means for receiving the data collection and for storing the entire data collection in the remote workstation;

means for storing in the name service directory the user name, an address for accessing the remote workstation via the network and at least a portion of the data collection;

data collection class information in the local workstation having information defining a data structure for holding data, a first member function for retrieving the data from the name service directory and a second member function for retrieving information from the remote workstation;

means for instantiating a first data collection object from the data collection class information;

means for executing the first member function in the first data collection object with the user name to retrieve the data collection portion and the address stored in the name service directory and to store the data collection portion in the data structure.

42. The apparatus as recited in claim 43 further comprising means for executing the second member function with the retrieved address to retrieve the entire data collection from the remote workstation and to store the entire data collection in the data structure.

\* \* \* \* \*